(12) United States Patent
Park et al.

(10) Patent No.: US 11,249,559 B2
(45) Date of Patent: Feb. 15, 2022

(54) ELECTRONIC DEVICE AND METHOD FOR CONTROLLING RESET OF CONTROL IC

(71) Applicant: Samsung Electronics Co., Ltd., Gyeonggi-do (KR)

(72) Inventors: Hyeongsoon Park, Gyeonggi-do (KR);
Dongil Son, Gyeonggi-do (KR);
Jeonggyu Jo, Gyeonggi-do (KR);
Yanghee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/004,147

(22) Filed: Aug. 27, 2020

(65) Prior Publication Data

US 2021/0096659 A1 Apr. 1, 2021

(30) Foreign Application Priority Data

Sep. 27, 2019 (KR) .................. 10-2019-0119794

(51) Int. Cl.
*G06F 3/023* (2006.01)
*G06F 1/28* (2006.01)
*G06F 3/041* (2006.01)
*G06F 11/07* (2006.01)

(52) U.S. Cl.
CPC .............. *G06F 3/0238* (2013.01); *G06F 1/28* (2013.01); *G06F 3/041* (2013.01); *G06F 11/0757* (2013.01)

(58) Field of Classification Search
CPC .......... G06F 11/0757; G06F 1/24; G06F 1/26; G06F 11/1441; G06F 1/3206; G06F 1/3212; G06F 3/041; G06F 3/147; G06F 1/325; G06F 1/32; G06F 1/3265; G06F 1/3203; H02M 1/0845; H02M 3/156; H02M 1/009; G09G 2330/021; G09G 1/005; G09G 2330/023
See application file for complete search history.

(56) References Cited

U.S. PATENT DOCUMENTS

| 9,697,065 B1 * | 7/2017 | Abhishek ................ G06F 13/00 |
| 2013/0176257 A1 | 7/2013 | Park |
| 2014/0251776 A1 | 9/2014 | Kim et al. |

(Continued)

FOREIGN PATENT DOCUMENTS

| CN | 104679347 A | 6/2015 |
| JP | 6159610 B2 | 6/2017 |
| KR | 10-2013-0081923 A | 7/2013 |

OTHER PUBLICATIONS

International Search Report dated Dec. 2, 2020.

*Primary Examiner* — Sanjiv D. Patel
(74) *Attorney, Agent, or Firm* — Cha & Reiter, LLC

(57) ABSTRACT

Certain embodiments of the disclosure relate to an electronic device and a method for controlling a reset of a control IC. The electronic device may include a battery, at least one sensor, a control IC operatively connected to the at least one sensor, a reset IC operatively connected to the control IC, and a power supply unit operatively connected to the reset IC, wherein when an operation signal is not received from the control IC for a predetermined time, the reset IC is configured to control a voltage and/or current being applied to the control IC by controlling the power supply unit. Other certain embodiments are possible.

16 Claims, 8 Drawing Sheets

(56) References Cited

U.S. PATENT DOCUMENTS

| | | |
|---|---|---|
| 2016/0018880 A1* | 1/2016 | Jung .................... G06F 1/3287 |
| | | 713/323 |
| 2016/0172882 A1 | 6/2016 | Hatanaka et al. |
| 2017/0279299 A1 | 9/2017 | Wang et al. |
| 2018/0159345 A1 | 6/2018 | Lin |
| 2018/0181084 A1 | 6/2018 | Yonemoto |
| 2018/0375511 A9 | 12/2018 | Schnaitter et al. |
| 2018/0375512 A1 | 12/2018 | Gao |

* cited by examiner

ELECTRONIC DEVICE AND METHOD FOR CONTROLLING RESET OF CONTROL IC

CROSS-REFERENCE TO RELATED APPLICATION

This application is based on and claims priority under 35 U.S.C. § 119 to Korean Patent Application No. 10-2019-0119794 filed on Sep. 27, 2019, in the Korean Intellectual Property Office, the disclosure of which is herein incorporated by reference in its entirety.

BACKGROUND

Field

Certain embodiments of the disclosure relate to an electronic device and a method for controlling a reset of a control integrated circuit (IC) connected to a sensor.

Description of Related Art

With increased usage portable electronic devices, an increasing number of functions are being added to the portable electronic devices. With the increased number of functions, it is important to provide a way that the user can quickly select a specific one of the functions. One way is to map a specific function to a physical key. However, physical keys can suffer from malfunctions which cause the portable electronic device to lock up.

SUMMARY

An electronic device according to certain embodiments of the disclosure may include: a battery; at least one sensor; a control IC operatively connected to the at least one sensor; a reset IC operatively connected to the control IC; and a power supply unit operatively connected to the reset IC, wherein when an operation signal is not received from the control IC for a predetermined time, the reset IC is configured to control a voltage and/or current being applied to the control IC by controlling the power supply unit.

An electronic device according to certain embodiments of the disclosure may include: at least one sensor; a control IC operatively connected to the at least one sensor; and a reset IC operatively connected to the control IC, when an operation signal is not received from the control IC for a predetermined time, the reset IC is configured to transfer a reset signal to the control IC.

A method for controlling a reset of a control IC in an electronic device according to certain embodiments of the disclosure may include: monitoring, by a reset IC in the electronic device, an operation signal of the control IC connected to at least one sensor; identifying, by the reset IC, whether the operation signal is received from the control IC for a predetermined time; operating, by the reset IC, a power supply unit in case that the operation signal is not received from the control IC for the predetermined time; and resetting, by the power supply unit, the control IC by controlling a voltage and/or current being applied to the control IC.

A method for controlling a reset of a control IC in an electronic device according to certain embodiments of the disclosure may include: monitoring, by a reset IC in the electronic device, an operation signal of the control IC connected to at least one sensor; identifying, by the reset IC, whether the operation signal is received from the control IC for a predetermined time; transferring, by the reset IC, a reset signal to the control IC in case that the operation signal is not received from the control IC for the predetermined time; and resetting the control IC in accordance with the transferred reset signal.

Effects that can be obtained in the disclosure are not limited to the above-described effects, and other unmentioned effects can be clearly understood by those of ordinary skill in the art to which the disclosure pertains from the following description.

BRIEF DESCRIPTION OF THE DRAWINGS

The above and other aspects, features and advantages of certain embodiments of the disclosure will be more apparent from the following detailed description, taken in conjunction with the accompanying drawings, in which.

DETAILED DESCRIPTION

A physical key can project from a specific location of a housing of an electronic device to outside. The physical key may be removed and replaced with a sensor (e.g., touch key or pause key) in the housing. The sensor may substitute for the function of the physical key.

In a case that the physical key (e.g., power on/off key) is configured as the sensor, the electronic device may locked up. The lock up may occur when a control integrated circuit (IC) connected to the sensor malfunctions or stops. The malfunctioning or stoppage of the IC may occur due to an electric shock, such as overvoltage, or other problems of the electronic device.

In this case, the electronic device may not be able to be controlled. This includes not only the power on/off but also other functions associated with the sensor during the operation of the electronic device.

Certain embodiments of the disclosure can provide an electronic device and a method, which provide operation stability against a lock-up situation by controlling reset of a control IC connected to a function key in the electronic device that uses the sensor (e.g., touch key or pause key) instead of a physical key (e.g., hardware key).

Certain embodiments of the disclosure can secure the operation stability against the lock-up situation of the electronic device by controlling the reset of the control IC using the sensor instead of the physical key.

Hereinafter, various example embodiments of the disclosure will be described in greater detail with reference to accompanying drawings.

Figure 1:
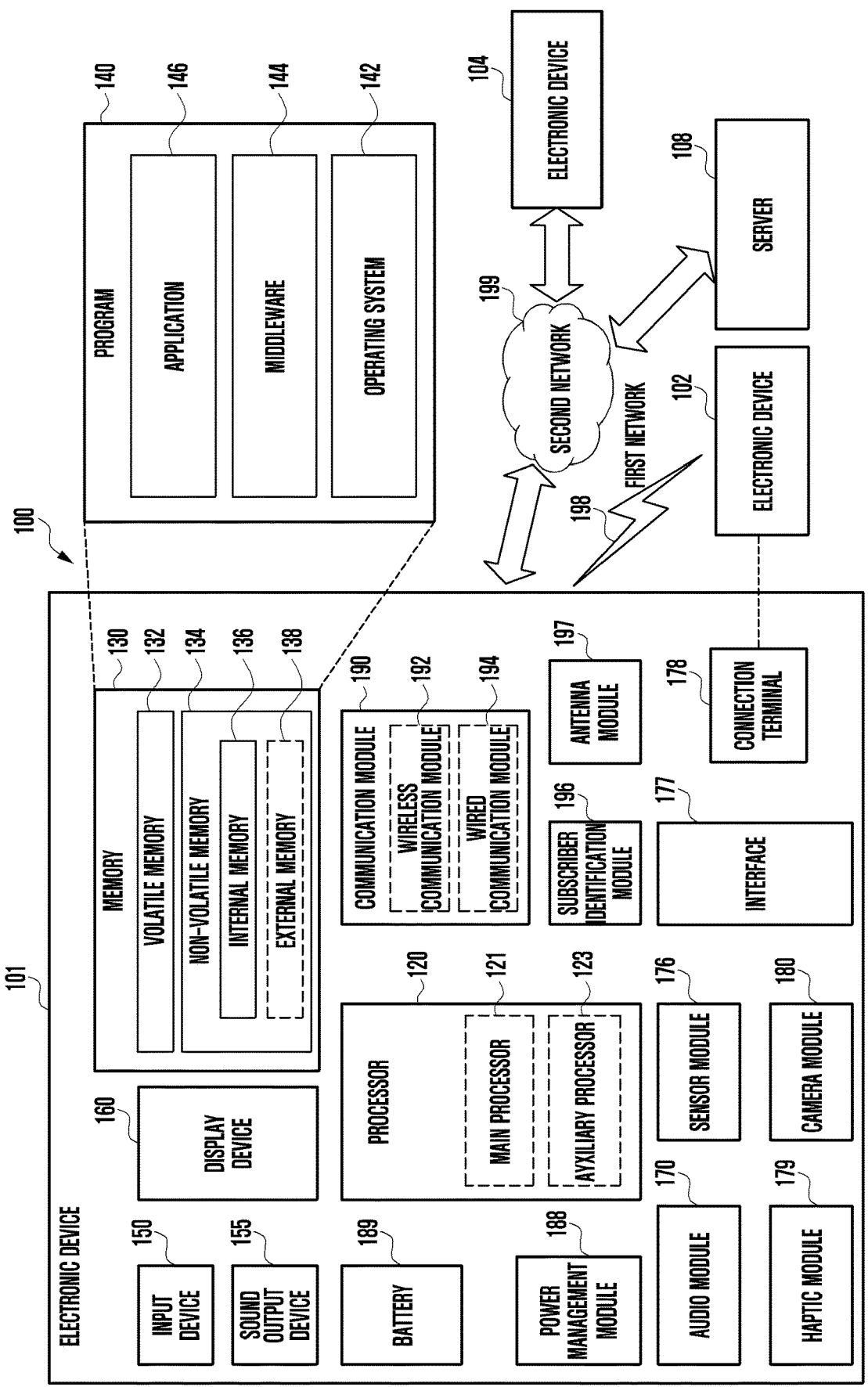
FIG. 1 is a block diagram of an electronic device in a network environment according to certain embodiments of the disclosure.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform certain data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store certain data used by at least one component (e.g., the processor 120 or the sensor module 176) of the electronic device 101. The certain data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These certain types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit/receive a signal or power to/from an external entity (e.g., an external electronic device). According to some embodiments, the antenna module 197 may be formed of a conductor or a conductive pattern and may further include any other component (e.g., RFIC). According to an embodiment, the antenna module 197 may include one or more antennas, which may be selected to be suitable for a communication scheme used in a specific communication network, such as the first network 198 or the second network 199 by, for example, the communication module 190. Through the selected at least one antenna, a signal or power may be transmitted or received between the communication module 190 and the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of certain types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include certain changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 100 can provide numerous functions, including, but not limited to, a phone function, texting function, email, web browsing, and payment functions, to name a few. Due to the number of functions, a soft key corresponding to a sensor may be mapped by the user to a particular one of the number of functions. To prevent a lockup due to malfunctioning of a control IC associated with the sensor, reset of the control IC uses the sensor.

Figure 2:
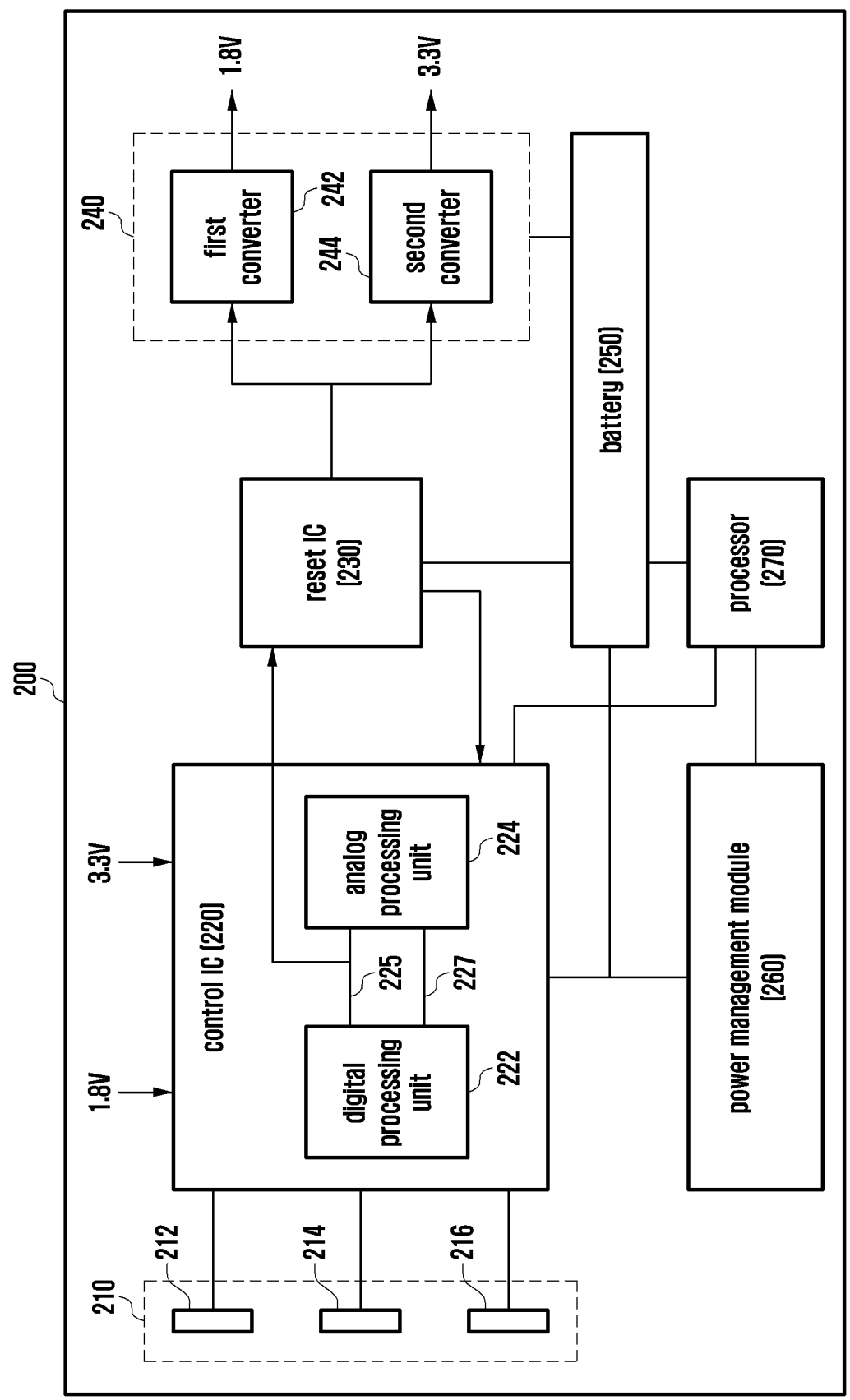
FIG. 2 is a block diagram illustrating the configuration of an electronic device controlling a reset of a control IC according to certain embodiments of the disclosure.

FIG. 2 is a block diagram illustrating the configuration of an electronic device controlling a reset of a control IC according to certain embodiments of the disclosure.

With reference to FIG. 2, an electronic device 200 according to certain embodiments of the disclosure may include a sensor 210, a control IC 220, a reset IC 230, a power supply unit 240, a battery 250 (e.g., battery 189 of FIG. 1), a power management module 260 (e.g., power management module 188 of FIG. 1), and a processor 270 (e.g., processor 120 of FIG. 1).

To alleviate a lock-out condition at the control IC 220, the reset IC 230 acts as a watchdog to detect abnormality at the control IC 220. Upon detection of an abnormality, the reset IC 230 can control the power supply unit 240 to reset the control IC 220.

For example, the control IC 220 can use a clock signal. The reset IC 230 can receive the clock signal from the control IC 230. When the reset IC 230 does not receive the clock signal for a predetermined time, the reset IC 230 can deem the control IC 220 to be behaving abnormal. Accordingly, the reset IC 230 can cause the control IC 220 to reset.

According to certain embodiments, the electronic device 200 of FIG. 2 may include at least one component of the electronic device 101 disclosed in FIG. 1.

According to an embodiment, the sensor 210 may be configured by a logic type soft key built in the housing of the electronic device 200 to outside. The sensor 210 may be included in the housing. The sensor 210 may be configured by a touch key or a pause key formed in the electronic device 200. The sensor 210 may sense a value being changed in accordance with an external input of the electronic device 200, and may be operated as a key input if the sensing value is equal to or higher than a predetermined level.

According to certain embodiments, the sensor 210 may sense at least one value of a capacitance value, a force value, and/or resistance value.

According to certain embodiments, the sensor 210 may be mapped onto various functions in the electronic device 200. For example, the sensor 210 may include at least one of a volume up key 212, a volume down key 214, and a power on/off key 216. The volume up key 212 may adjust sound being output from the electronic device 200 to be louder. The volume down key 214 may adjust the sound being output from the electronic device 200 to be lower. The power on/off key 216 may turn on or off a power of the electronic device 200. The sensor 210 may further include at least one of a home key (not illustrated), a voice agent call key (not illustrated), or a camera key (not illustrated). The voice agent call key may perform a function required by a user by recognizing a voice command of a word for calling to the electronic device 200. The sensor 210 may include various keys capable of controlling the operation of the electronic device in addition to the above-described keys.

According to an embodiment, the control IC 220 may be operatively connected to the sensor 210. The control IC 220 may control the sensor 210. If the sensing value of the sensor 210 is equal to or higher than the predetermined level, the control IC 220 may recognize this as a specific key input, and may operate the sensor. The control IC 220 may use a clock signal for its internal operation.

The control IC 220 may be operatively connected to the reset IC 230. The clock signal of the control IC 220 may be transferred to the reset IC 230. The control IC 220 may be operatively connected to the power management module 260. The control IC 220 may transfer an operation signal (e.g., clock signal) to the power management module 260, and may monitor the power management module 260. The function of the reset IC 230 may be included in the power management module 260. The control IC 220 may operatively connected to the processor 270. The control IC 220 may transfer a signal detected through the sensor 210 to the processor 270. The processor 270 may perform a control operation in accordance with the signal being transferred through the control IC 220.

According to certain embodiments, the control IC 220 may include a processor configured to receive an analog signal from the outside of the electronic device 200 and to convert the received analog signal into a digital signal. The control IC 220 may include a digital processing unit 222 and an analog processing unit 224. The digital processing unit 222 and the analog processing unit 224 may include interfaces for communication with each other. The digital processing unit 222 and the analog processing unit 224 may be connected to each other through a clock line (serial clock line) 225 and a data line (serial data line) 227. The clock line may transmit the clock signal in a predetermined period to match synchronization between the digital processing unit 222 and the analog processing unit 224.

According to an embodiment, the reset IC 230 may be operatively connected to the control IC 220. If the operation signal (e.g., clock signal) is not received from the control IC 220 for a predetermined time, the reset IC 230 may reset (e.g., reboot) the control IC 220 by controlling a voltage and/or current of the power supply unit 240. Through the control of the voltage and/or current, it is possible to supply or limit the voltage and/or current output from the power supply unit 240.

According to certain embodiments, the reset IC 230 may include a watchdog IC configured to monitor existence/nonexistence of abnormality with respect to the operation signal of the control IC 220. The reset IC 230 may control the voltage and/or current of the battery 260 being applied to the control IC 220 by controlling the power supply unit 240.

According to certain embodiments, if the operation signal (e.g., clock signal) is not received from the control IC 220 for a predetermined time, the reset IC 230 may transfer a reset signal to the control IC 220. In accordance with the transferred reset signal, the control IC 220 may be reset (e.g., rebooted).

According to an embodiment, the power supply unit 240 may be operatively connected to the reset IC 230. The power supply unit 240 may operate in accordance with a monitoring signal being transferred from the reset IC 230.

According to certain embodiments, the power supply unit 240 may convert the voltage (e.g., about 3.8 V to 4.4 V) of the battery 250 into a voltage (e.g., about 1.8 V to 3.3 V) required to drive the control IC 220. The power supply unit 240 may include a first converter 242 and a second inverter 244. The first converter 242 may convert the voltage (e.g., about 3.8 V to 4.4 V) of the battery 250 into a voltage (e.g., about 1.8 V) required to drive the digital processing unit 222 of the control IC 220. The second converter 244 may convert the voltage (e.g., about 3.8 V to 4.4 V) of the battery 250 into a voltage (e.g., about 3.3 V) required to drive the analog processing unit 224 of the control IC 220.

According to an embodiment, when the power of the electronic device 200 is turned on, the battery 250 may supply a power to the electronic device 200.

According to certain embodiments, the battery 250 may include a battery 189 disclosed in FIG. 1. The battery 250 may supply the power to at least one constituent element (e.g., the reset IC 230, the power supply unit 240, the power management module 260, and the processor 270) of the electronic device 200. The battery 250 may include, for example, a non-rechargeable primary battery, a rechargeable secondary battery, or a fuel cell.

According to an embodiment, the power management module 260 may include the power management module 188 disclosed in FIG. 1. The power management module 260 may be electrically connected to the battery 250. The power management module 260 may control the power being supplied to the electronic device 200. For example, if the electronic device 200 is turned on using the power on/off key 216 that is one of the sensors 210, the power management module 260 may supply the power of the battery 250 to at least one constituent element (e.g., the reset IC 230, the power supply unit 240, and the processor 270) of the electronic device 200. For example, the power management module 260 may receive a command from the processor 270, and may manage the power supply in response to the command.

According to certain embodiments, the power management module 260 may include a power management integrated circuit (PMIC), a charger integrated circuit (charger IC), or a battery or a fuel gauge. The power management module 260 may support wired or wireless charging.

According to an embodiment, the processor 270 may include the processor 120 disclosed in FIG. 1. The processor 270 may be operatively connected to at least one of the control IC 220, the reset IC 230, the power supply unit 240, the battery 250, and the power management module 260.

According to certain embodiments, the processor 270 may control the overall operation of the electronic device 200 and signal flows between internal constituent elements, and may perform a function of processing data. The processor 270 may include, for example, at least one of a central processing unit (CPU), an application processor, and/or a communication processor. The processor 270 may include a processor (e.g., sensor hub) operating with a lower power than the power of the application processor. The processor 270 may include both the application processor and the sensor hub. The processor 270 may be formed as a single core processor or a multi-core processor, and may be composed of a plurality of processors.

Figure 3:
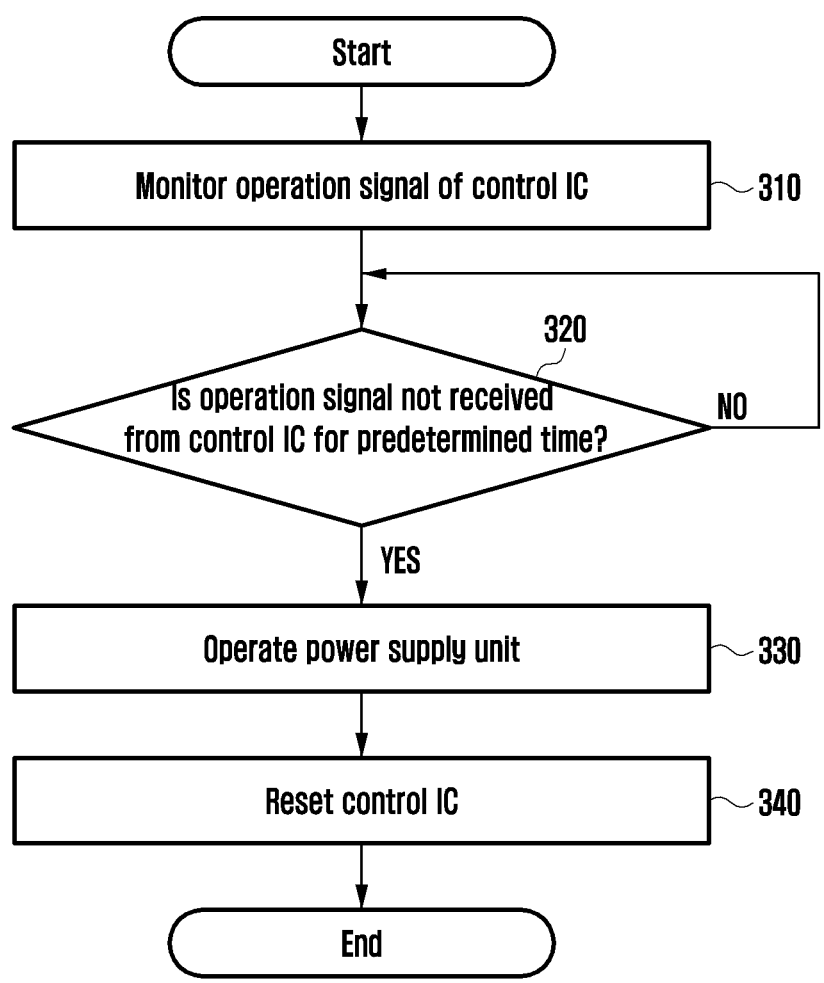
FIG. 3 is a flowchart illustrating a method of an embodiment for controlling a reset of a control IC according to certain embodiments of the disclosure.

FIG. 3 is a flowchart illustrating a method of an embodiment for controlling a reset of a control IC according to certain embodiments of the disclosure.

For example, operations of FIG. 3 may be performed by the electronic device 200 disclosed in FIG. 2.

At operation 310, the reset IC 230 may monitor the operation signal (e.g., clock signal) of the control IC 220 connected to the at least one sensor 210.

At operation 320, the reset IC 230 may identify whether the operation signal is received from the control IC for a predetermined time.

At operation 330, if the operation signal is not received from the control IC 220 for the predetermined time, the reset IC 230 may operate the power supply unit 240. According to an embodiment, if there is not an output signal from the control IC 220, the reset IC 230 may operate the power supply unit 240.

At operation 340, the power supply unit 240 may reset (e.g., reboot) the control IC 220 by controlling the voltage and/or current being applied to the control IC 220.

Figure 4:
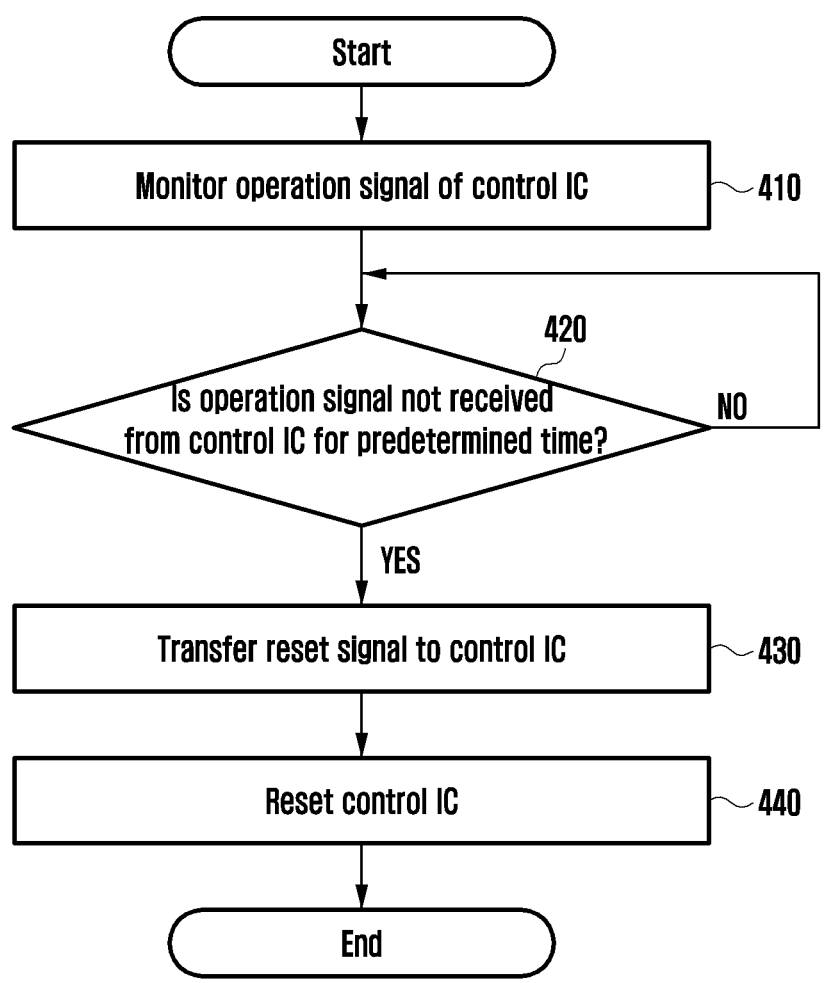
FIG. 4 is a flowchart illustrating a method of another embodiment for controlling a reset of a control IC according to certain embodiments of the disclosure.

FIG. 4 is a flowchart illustrating a method of another embodiment for controlling a reset of a control IC according to certain embodiments of the disclosure.

For example, operations of FIG. 4 may be performed by the electronic device 200 disclosed in FIG. 2.

At operation 410, the reset IC 230 may monitor the operation signal (e.g., clock signal) of the control IC 220 connected to the at least one sensor 210.

At operation 420, the reset IC 230 may identify whether the operation signal is received from the control IC for a predetermined time.

At operation 430, if the operation signal is not received from the control IC 220 for the predetermined time, the reset IC 230 may transfer a reset signal to the control IC 220.

At operation 440, in accordance with the transferred reset signal, the control IC 220 may be reset.

Figure 5:
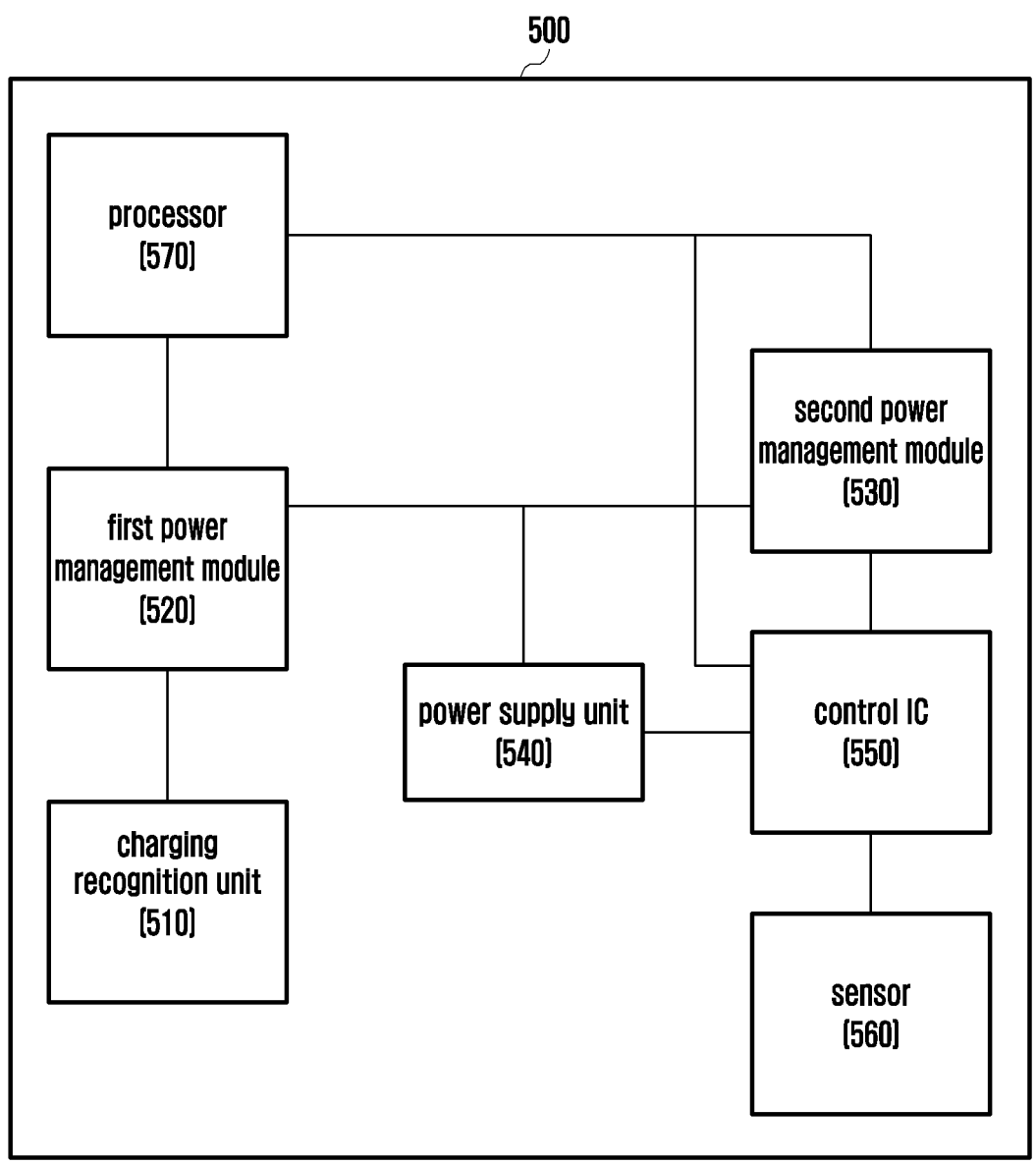
FIG. 5 is a block diagram illustrating the configuration of an electronic device controlling a reset of a control IC during a charging recognition according to certain embodiments of the disclosure.

FIG. 5 is a block diagram illustrating the configuration of an electronic device controlling a reset of a control IC during a charging recognition according to certain embodiments of the disclosure.

In the description with reference to FIG. 5, duplicate explanation of the same configurations and functions as those in the embodiment as described above with reference to FIG. 2 may be omitted.

With reference to FIG. 5, an electronic device 500 according to certain embodiments of the disclosure may include a charging recognition unit 510, a first power management module 520, a second power management module 530, a power supply unit 540, a control IC 550, a sensor 560, and a processor 570.

The charging recognition unit 510 may detect when the electronic device is charging or when an external electronic device is proximate. The charging recognition unit 510 sends a detection signal to the second power management module 530. Based on the signal, the second power management module 520 may supply a reset voltage to the control IC 550. According to certain embodiments, the electronic device 500 of FIG. 5 may include at least one of the constituent elements of the electronic device 101 or 200 disclosed in FIG. 1 or FIG. 2. For example, the first power management module 520 and the second power management module 530 may include the power management module 188 or 260 disclosed in FIG. 1 or FIG. 2. The power supply unit 540 may include the power supply unit 240 disclosed in FIG. 2. The control IC 550 may include the control IC 220 disclosed in FIG. 2. The sensor 560 may include the sensor 210 disclosed in FIG. 2. The processor 570 may include the processor 120 or 270 disclosed in FIG. 1 or FIG. 2. The electronic device 500 may include the battery 250 disclosed in FIG. 2.

The charging recognition unit 510 may detect whether the electronic device 500 is connected to an external charger (not illustrated) by wire and/or wirelessly. The charging recognition unit 510 may transfer a wired and/or wireless charging detection signal to the first power management module 520.

The charging recognition unit 510 may recognize the wireless charging. In this case, the electronic device 500 may include a coil (e.g., coil 610 of FIG. 6).

The electronic device 500 may recognize a connection of an external electronic device, such as a USB (not illus-trated), through a connection port (e.g., connection port 178 of FIG. 1). In this case, the charging recognition unit 510 may not be separately provided. Depending on whether the external electronic device is connected, the electronic device 500 may reset the control IC 550 through the first power management module 520 or the processor 570.

The first power management module 520 may transfer the charging detection signal or an external electronic device (e.g., USB or headset) recognition signal (now collectively referred to as "detection signal") to the second power management module 530. The first power management module 520 may include an interface power management IC (interface PMIC).

In accordance with the detection signal being received from the first power management module 520, the second power management module 530 may determine whether the electronic device 500 is being charged, and may manage the power being supplied to the electronic device 500. For example, the second power management module 530 may supply a reset voltage to the control IC 550 in accordance with the detection signal.

The power supply unit 540 may bridge and transfer, to the control IC 550, the detection signal being transferred from the first power management module 520. The power supply unit 540 may include a pull up resistor.

In accordance with the charging detection signal being transferred from the power supply unit 540, the control IC 550 may be reset (or rebooted) using the voltage being transferred from the second power management module 530. The control IC 550 may transfer the operation signal (e.g., clock signal) to the second power management module 530. If an edge trigger type signal is received, the control IC 550 may be reset only at a falling edge of the signal. The control IC 550 may be reset using a level trigger type. The control IC 550 of the electronic device 500 may be reset only in case that the charging recognition unit 510 recognizes the charging detection signal or the first power management module 520 recognizes the external electronic device.

The sensor 560 may be operatively connected to the control IC 550. The sensor 560 may be functionally mapped onto at least one of the volume up key 212, volume down key 214, power on/off key 216, home key, voice agent call key, or camera key disclosed in FIG. 2. In addition to the above-described keys, the sensor 210 may include various keys capable of controlling the operation of the electronic device 500.

The processor 570 may be operatively connected to the control IC 550. If the operation signal (e.g., clock signal) is not received from the control IC 550 for a predetermined time, the processor 570 may control the second power management module 530 to reset (e.g., reboot) the control IC 550.

Because the control IC 550 is reset whenever the charging recognition unit 510 detects the charging detection signal or the first power management module 520 recognizes the external electronic device, the electronic device 500 can avoid a situation where the processor 570 and the control IC 550 are simultaneously locked up.

In certain embodiments, an NFC reader or NFC card can provide a specific mode entering signal. An NFC IC can receive the specific mode entering signal and may either reset, boot, or place the control IC in a binary download mode.

Figure 6:
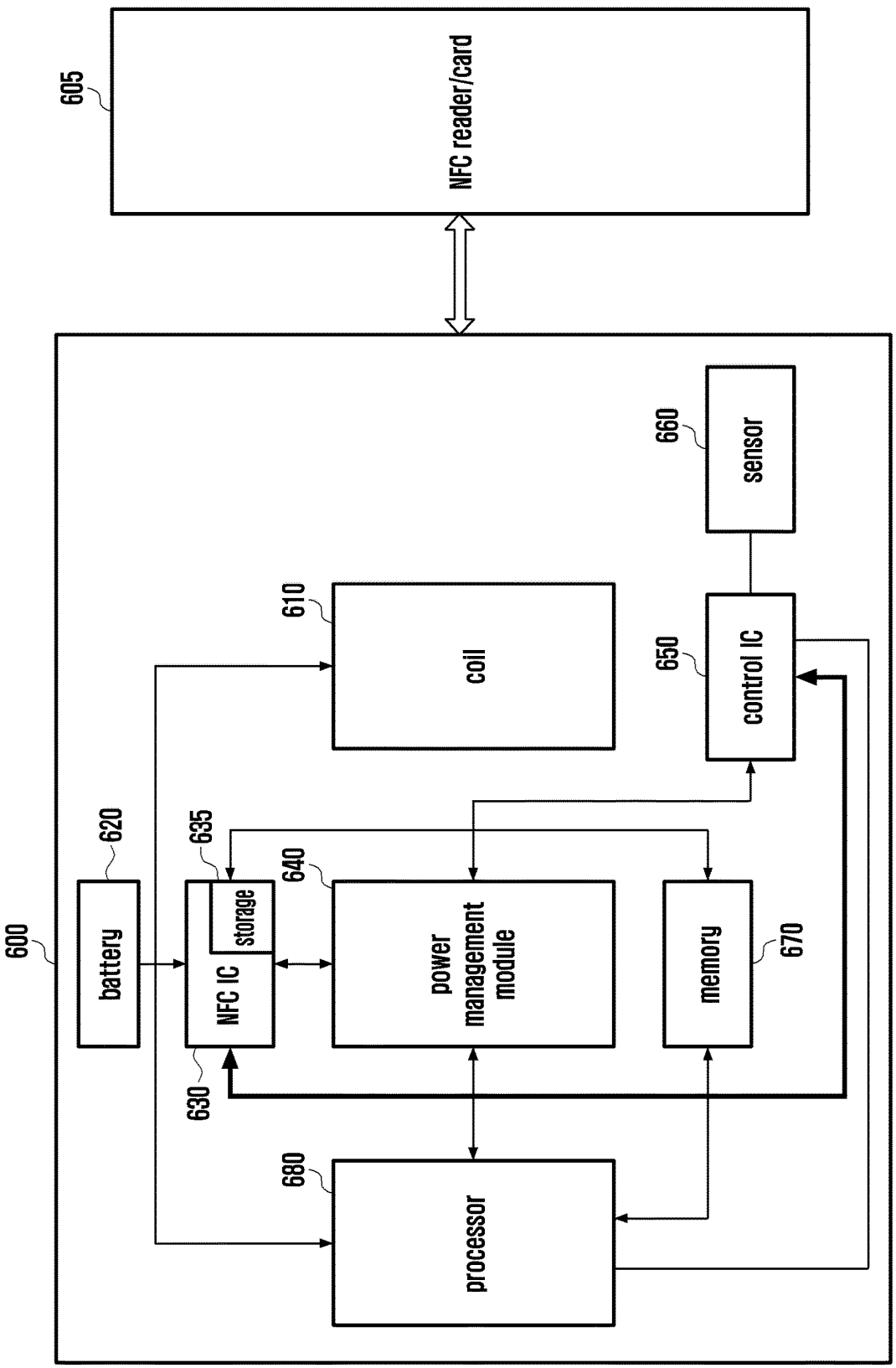
FIGS. 6, 7 and 8 are block diagrams illustrating the configurations controlling a reset mode or a booting mode of an electronic device using an external electronic device according to certain embodiments of the disclosure.
Figure 7:
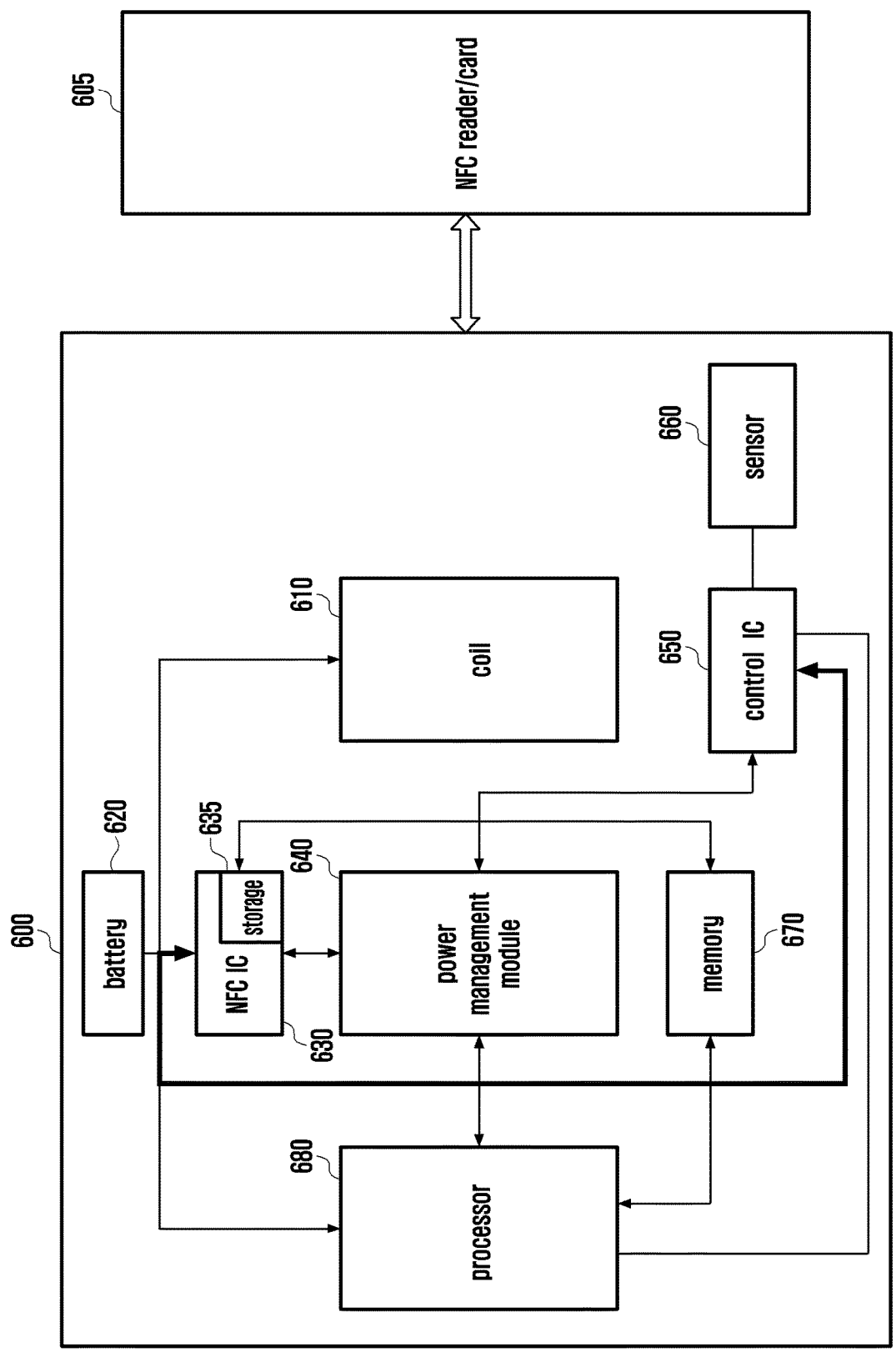
Figure 8:
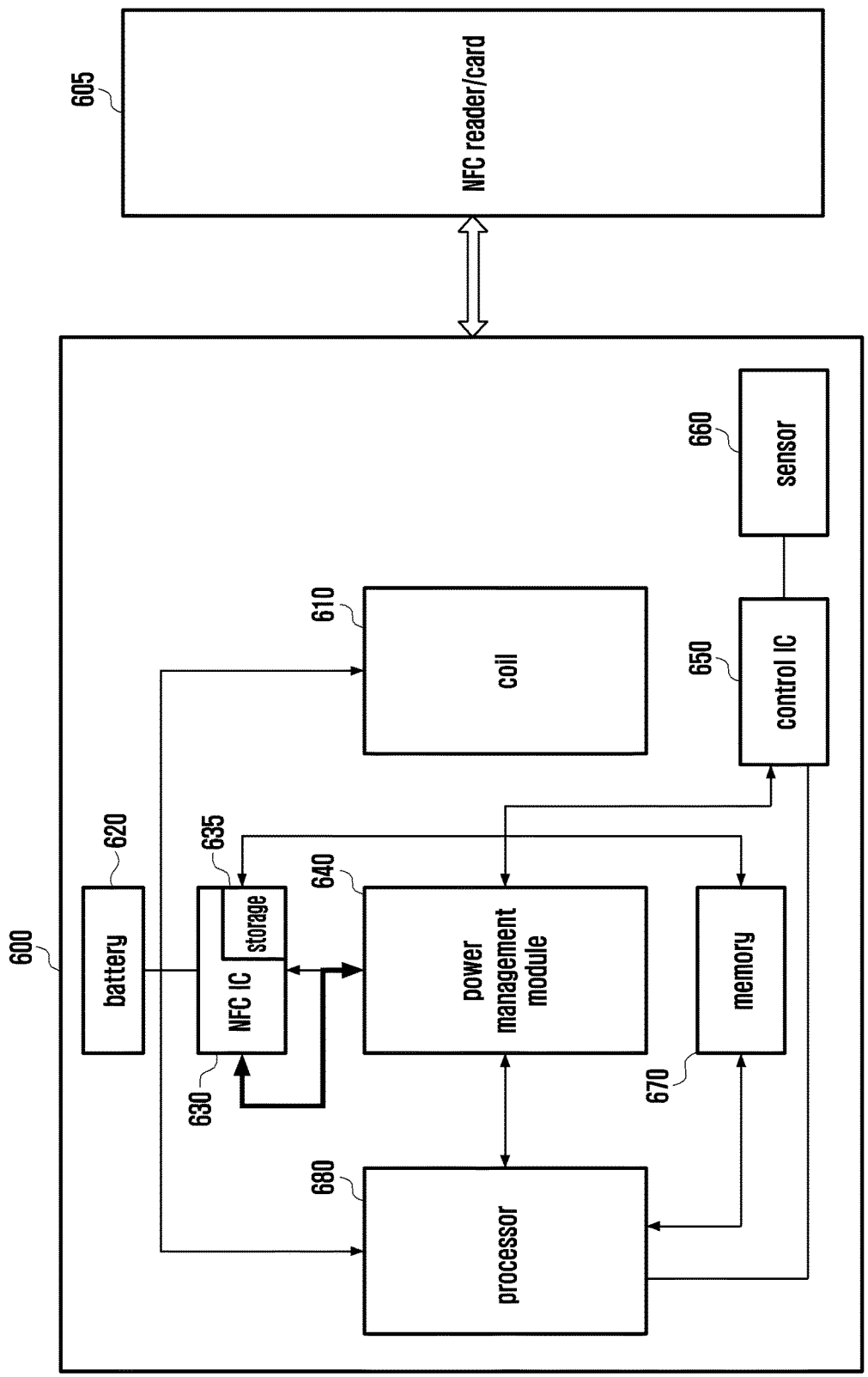

FIGS. 6 to 8 are block diagrams illustrating the configurations controlling a reset mode or a booting mode of an electronic device using an external electronic device according to certain embodiments of the disclosure.

In the description with reference to FIGS. 6 to 8, duplicate explanation of the same configurations and functions as those in the embodiments as described above with reference to FIG. 2 or FIG. 5 may be omitted.

According to certain embodiment, an electronic device 600 of FIGS. 6 to 8 may include at least one of the constituent elements of the electronic device 101, 200, or 500 disclosed in FIG. 1, FIG. 2, or FIG. 5. For example, a battery 620 may include the battery 189 or 250 disclosed in FIG. 1 or FIG. 2. The power management module 640 may include the power management module 188 or 260 disclosed in FIG. 1 or FIG. 2. A control IC 650 may include the control IC 220 or 550 disclosed in FIG. 2 or FIG. 5. A sensor 660 may include the sensor 210 or 560 disclosed in FIG. 2 or FIG. 5. A memory 670 may include the memory 130 disclosed in FIG. 1. A processor 680 may include the processor 120, 270, or 570 disclosed in FIG. 1, FIG. 2, or FIG. 5.

With reference to FIGS. 6 to 8, the electronic device 600 may be connected to an external electronic device 605 by wire or wirelessly, and may perform communication with the external electronic device 605. If a connection (e.g., tag) of the electronic device 600 is detected, the external electronic device 605 may transfer a signal for entering a specific mode (e.g., reset mode or booting mode) to the electronic device 600. The external electronic device 605 may include a near field communication (NFC) reader or an NFC card.

The NFC reader or NFC card can provide a specific mode entering signal to the electronic device 600. The NFC IC 630 detects the signal and either boots, resets, or places the control IC 650 into a data download mode.

The electronic device 600 according to certain embodiments of the disclosure may include a coil 610, a battery 620, an NFC IC 630, a power management module 640, a control IC 650, a sensor 660, a memory 670, and a processor 680.

The coil 610 may support to perform wireless communication in case that the external electronic device 605 approaches or tags the electronic device 600. The coil 610 may perform the near field communication (NFC). The coil 610 may include an NFC coil antenna (e.g., antenna module 197 of FIG. 1).

According to an embodiment, during the power-on of the electronic device 600, the battery 620 may supply the power to the electronic device 600. The battery 620 may supply the power to the NFC IC 630 even in case that the electronic device 600 is turned off or is locked up.

According to an embodiment, the NFC IC 630 may be operatively connected to at least one of the battery 620, the power management module 640, the control IC 650, and the processor 680. The NFC IC 630 may receive a specific mode entering signal (e.g., reset mode entering signal or booting mode entering signal) for the electronic device 600 being transferred from the external electronic device 605. The NFC IC 630 may reset the control IC 650 in accordance with the received specific mode entering signal (e.g., reset mode entering signal). The NFC IC 630 may make the electronic device 600 enter a booting mode or a binary download mode by controlling the power management module 640 in accordance with the received specific mode entering signal (e.g., booting mode entering signal).

According to certain embodiments, the NFC IC 630 may include a storage 635. The storage 635 may store a table capable of recognizing the external electronic device 605. The storage 635 may store the kind or ID of the external electronic device 605 (e.g., NFC reader or NFC card) to perform entering of the specific mode. The storage 635 may store a command being transferred from the external electronic device 605 through the NFC IC 630. The storage 635 may store more information in the memory 670.

According to an embodiment, the power management module 640 may control the power being supplied to the electronic device 200. The power management module 640 may supply the power of the battery 250 to at least one constituent element (e.g., the NFC IC 630, the control IC 650, and the processor 680) of the electronic device 600.

According to an embodiment, the control IC 650 may be operatively connected to the NFC IC 630, the power management module 640, and the processor 680. The control IC 650 may control the sensor 660. The control IC 650 may be reset in accordance with the specific mode entering signal (e.g., reset mode) being transferred from the NFC IC 630.

According to an embodiment, the sensor 660 may be operatively connected to the control IC 650. The sensor 660 may be functionally mapped onto at least one of the volume up key 212, volume down key 214, power on/off key 216, home key, voice agent call key, or camera key disclosed in FIG. 2. In addition of the above-described keys, the sensor 660 may include various keys capable of controlling the operation of the electronic device 600.

According to an embodiment, the memory 670 may be operatively connected to the storage 635 of the NFC IC 630. The memory 670 may share information stored in the storage 635. If the storage space of the storage 635 is insufficient, the memory 670 may provide a separate storage space.

According to certain embodiments, the memory 670 may perform a function of storing a program for processing and control of the processor 680, an operating system (OS), various applications, and input/output data. The memory 670 may store a program to control the overall operation of the electronic device 600. The memory 670 may store a user interface (UI) being provided from the electronic device 600 and various pieces of configuration information necessary for the electronic device 600 to process the functions.

According to an embodiment, the processor 680 may control the overall function of the electronic device 600. The processor 680 may be operatively connected to the coil 610, battery 620, control IC 650, power management module 640, control IC 650, and memory 670 and may control the functions of the respective constituent elements.

With reference to FIG. 6, the electronic device 600 may reset the control IC 650 using the external electronic device 605 (e.g., NFC reader or NFC card).

According to an embodiment, if the electronic device 600 senses the external electronic device 605 through the coil 610, the external electronic device 605 may transfer the specific mode (e.g., reset mode or booting mode) entering signal to the electronic device 600.

According to an embodiment, the NFC IC 630 may receive the specific mode entering signal.

According to an embodiment, the NFC IC 630 may identify whether the specific mode entering signal is for the reset mode or the booting mode through the information stored in the storage 635.

According to an embodiment, the NFC IC 630 may transmit the reset signal to the control IC 650 if the specific mode entering signal is the reset mode entering signal.

According to an embodiment, the control IC 650 may receive the reset signal to be reset.

According to certain embodiments, the NFC IC 630 may transfer the reset mode entering signal to the power management module 640. The power management module 640 may reset the control IC 650 by controlling the power being transferred to the control IC 650.

According to certain embodiments, the NFC IC 630 may reset the control IC 650 whenever the connection of the external electronic device 605 is detected through the coil 610.

According to certain embodiments, if the signal that is generated when the electronic device 600 recognizes the external electronic device 605 and the operation signal (e.g., clock signal) that is generated by the control IC 650 are not received, the processor 680 may reset the control IC 650.

With reference to FIG. 7, if the connection of the external electronic device 605 (e.g., NFC reader or NFC card) is detected, the electronic device 600 may reset the control IC 650 using the specific mode entering signal being transferred to the processor 680.

According to an embodiment, if the electronic device 600 senses the external electronic device 605 through the coil 610, the external electronic device 605 may transfer the specific mode (e.g., reset mode or booting mode) entering signal to the electronic device 600.

According to an embodiment, the NFC IC 630 may receive the specific mode entering signal. The received specific mode entering signal may be transferred to the processor 680.

According to an embodiment, the NFC IC 630 may identify whether the specific mode entering signal is for the reset mode or the booting mode through the information stored in the storage 635.

According to an embodiment, the NFC IC 630 may transmit the reset signal to the control IC 650 by interrupting the specific mode entering signal (e.g., reset signal) being transferred to the processor 680.

According to an embodiment, the control IC 650 may receive the reset signal to be reset.

With reference to FIG. 8, the electronic device 600 may enter the booting mode using the external electronic device 605 (e.g., NFC reader or NFC card). The booting mode may include a binary download mode.

According to certain embodiments, if the electronic device 600, which is in an on state, senses the external electronic device 605 through the coil 610, the external electronic device 605 may transfer the specific mode (e.g., reset mode or booting mode) entering signal to the electronic device 600.

According to an embodiment, the NFC IC 630 may receive the specific mode entering signal.

According to an embodiment, the NFC IC 630 may identify whether the specific mode entering signal is for the reset mode or the booting mode through the information stored in the storage 635.

According to an embodiment, if the specific mode entering signal is the booting mode entering signal, the NFC IC 630 may transmit the booting signal to the processor 680.

According to an embodiment, the processor 680 may enter the booting mode (e.g., binary download mode) in accordance with the booting signal.

According to certain embodiments, if the electronic device 600, which is in an off state, senses the external electronic device 605 through the coil 610, the external electronic device 605 may transfer the specific mode (e.g., reset mode or booting mode) entering signal to the electronic device 600.

According to an embodiment, the NFC IC 630 may receive the specific mode entering signal.

According to an embodiment, the NFC IC 630 may identify whether the specific mode entering signal is for the reset mode or the booting mode through the information stored in the storage 635.

According to an embodiment, if the specific mode entering signal is the booting mode entering signal, the NFC IC 630 may transmit the booting signal to the power management module 640.

According to an embodiment, the power management module 640 may transfer the booting signal to the processor 680.

According to an embodiment, the processor 680 may enter the booting mode (e.g., binary download mode) in accordance with the booting signal.

Although the disclosure has been described according to certain embodiments of the disclosure, it is apparent that all changes or modifications made by those of ordinary skill in the art to which the disclosure pertains belong to the disclosure within a range that does not deviate from the technical idea of the disclosure.

What is claimed is:

1. An electronic device comprising:
   a battery;
   at least one sensor;
   a control IC operatively connected to the at least one sensor;
   a reset IC operatively connected to the control IC; and
   a power supply unit operatively connected to the reset IC,
   wherein when an operation signal is not received from the control IC for a predetermined time, the reset IC is configured to control a voltage and/or current being applied to the control IC by controlling the power supply unit,
   wherein the control IC further comprises a digital processing unit and an analog processing unit,
   wherein the power supply unit further comprises a first converter and a second converter configured to convert a voltage of the battery into a driving voltage of the control IC, and
   wherein the first converter is configured to convert the voltage of the battery into a driving voltage of the digital processing unit, and the second converter is configured to convert the voltage of the battery into a driving voltage of the analog processing unit.

2. The electronic device of claim 1, further comprising a housing, and wherein the at least one sensor is disposed in the housing of the electronic device.

3. The electronic device of claim 2, wherein the at least one sensor comprises a touch key or a pause key.

4. The electronic device of claim 1, wherein the at least one sensor comprises a key functionally mapped onto at least one of a volume up key, a volume down key, a power on and/or off key, a home key, a voice agent call key, or a camera key.

5. The electronic device of claim 1, wherein the digital processing unit and the analog processing unit are connected through a clock line and a data line.

6. An electronic device comprising:
   at least one sensor;
   a control IC operatively connected to the at least one sensor;
   a reset IC operatively connected to the control IC; and
   a first converter and a second converter configured to convert a battery voltage into a driving voltage of the control IC, wherein when an operation signal is not received from the control IC for a predetermined time, the reset IC is configured to transfer a reset signal to the control IC, wherein the control IC further comprises a digital processing unit and an analog processing unit, and wherein the first converter is configured to convert the battery voltage into a driving voltage of the digital processing unit, and the second converter is configured to convert the battery voltage into a driving voltage of the analog processing unit.

7. The electronic device of claim 6, further comprising a housing, and wherein the at least one sensor is disposed in the housing of the electronic device.

8. The electronic device of claim 7, wherein the at least one sensor comprises a touch key or a pause key.

9. The electronic device of claim 6, wherein the at least one sensor comprises a key functionally mapped onto at least one of a volume up key, a volume down key, a power on and/or off key, a home key, a voice agent call key, or a camera key.

10. The electronic device of claim 6, wherein the digital processing unit and the analog processing unit are connected through a clock line and a data line.

11. A method for controlling a reset of a control IC in an electronic device, comprising:

monitoring, by a reset IC in the electronic device, an operation signal of the control IC connected to at least one sensor;

identifying, by the reset IC, whether the operation signal is received from the control IC for a predetermined time;

operating, by the reset IC, a power supply unit in case that the operation signal is not received from the control IC for the predetermined time; and resetting, by the power supply unit, the control IC by controlling a voltage and/or current being applied to the control IC, wherein the control IC further comprises a digital processing unit and an analog processing unit, wherein the power supply unit further comprises a first converter and a second converter configured to convert a voltage of a battery into a driving voltage of the control IC, and wherein the first converter is configured to convert the voltage of the battery into a driving voltage of the digital processing unit, and the second converter is configured to convert the voltage of the battery into a driving voltage of the analog processing unit.

12. The method of claim 11, wherein the at least one sensor is disposed in a housing of the electronic device.

13. The method of claim 12, wherein the at least one sensor comprises a touch key or a pause key.

14. The method of claim 11, wherein the at least one sensor comprises a key functionally mapped onto at least one of a volume up key, a volume down key, a power on and/or off key, a home key, a voice agent call key, or a camera key.

15. The method of claim 11, wherein the digital processing unit and the analog processing unit are connected through a clock line and a data line.

16. A method for controlling a reset of a control IC in an electronic device, comprising:

monitoring, by a reset IC in the electronic device, an operation signal of the control IC connected to at least one sensor;

identifying, by the reset IC, whether the operation signal is received from the control IC for a predetermined time;

transferring, by the reset IC, a reset signal to the control IC in case that the operation signal is not received from the control IC for the predetermined time; and resetting the control IC in accordance with the transferred reset signal, wherein the control IC further comprises a digital processing unit and an analog processing unit, wherein the electronic device further comprises a first converter and a second converter configured to convert a battery voltage into a driving voltage of the control IC, and wherein the first converter is configured to convert the battery voltage into a driving voltage of the digital processing unit, and the second converter is configured to convert the battery voltage into a driving voltage of the analog processing unit.

* * * * *